(No Model.)
C. F. KRAEMER.
SHADE PROTECTING CASING.
No. 580,697.  Patented Apr. 13, 1897.
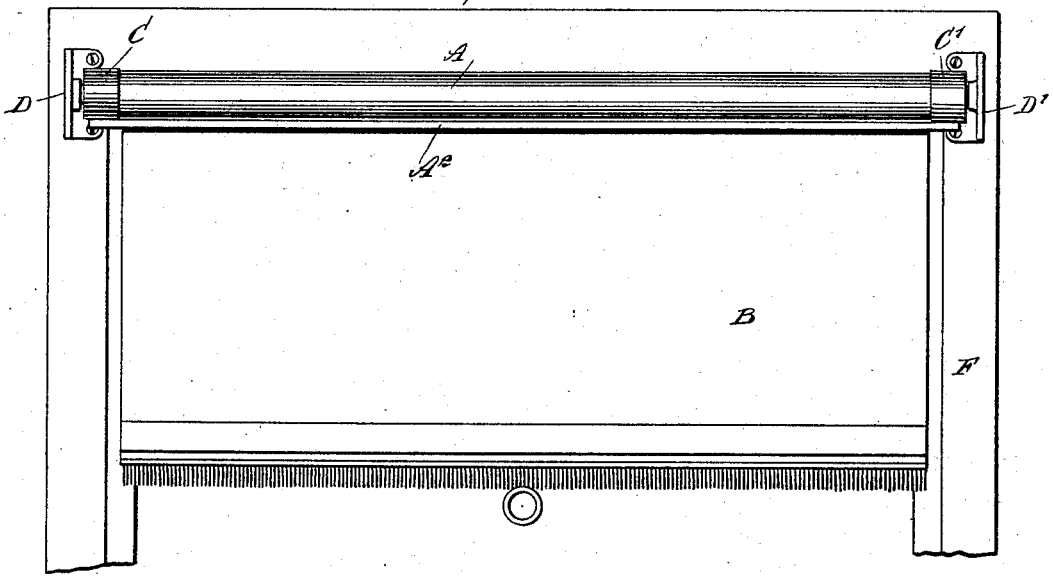
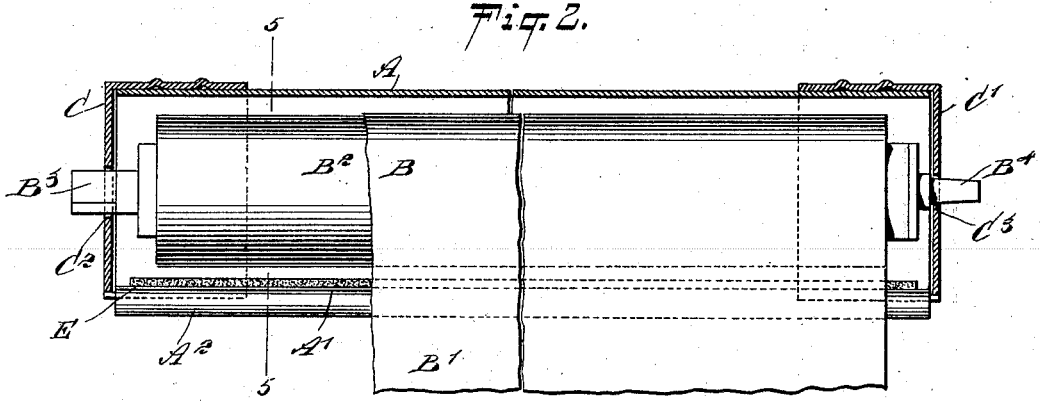
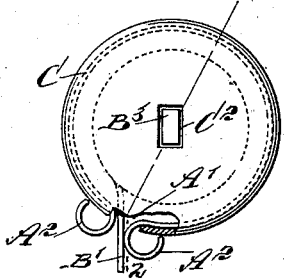
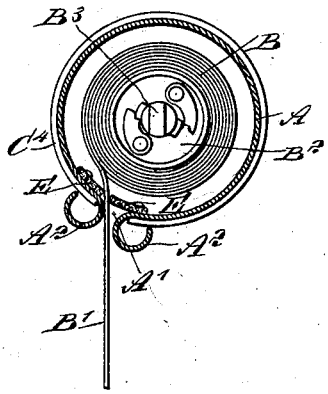
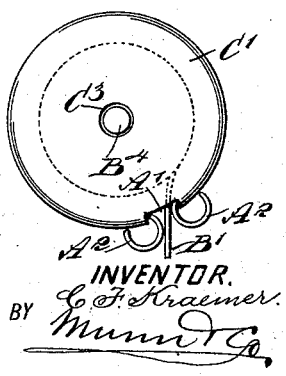
WITNESSES:
William P. Goebel
[signature]
INVENTOR.
C. F. Kraemer.
BY [signature]
ATTORNEYS.

UNITED STATES PATENT OFFICE.

CHARLES F. KRAEMER, OF COLLEGE POINT, NEW YORK.

SHADE-PROTECTING CASING.

SPECIFICATION forming part of Letters Patent No. 580,697, dated April 13, 1897.

Application filed January 8, 1897. Serial No. 618,433. (No model.)

*To all whom it may concern:*

Be it known that I, CHARLES F. KRAEMER, of College Point, in the county of Queens and State of New York, have invented a new and Improved Shade-Protecting Casing, of which the following is a full, clear, and exact description.

The object of the invention is to provide a new and improved window-shade-protecting casing, which is simple and durable in construction, readily applied to and supported by the ordinary window-shade to protect the same from dust and the like, and clean the webbing or fabric of the shade when returning the same into the casing.

The invention consists principally of a slotted casing and heads for the same, said heads engaging the trunnions of the shade-roller to support the casing therefrom.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement as applied. Fig. 2 is an enlarged sectional side elevation of the same on the line 2 2 of Fig. 3. Fig. 3 is a view of one end of the improvement with part in section. Fig. 4 is a view of the other end of the improvement, and Fig. 5 is a transverse section of the same on the line 5 5 of Fig. 2.

The improved device is provided with a casing A, made of sheet metal or other suitable material, and adapted to contain a shade B, having the usual webbing B', extending through a longitudinal slot A', formed throughout the length of the casing A, the sides of the split casing being turned up to form longitudinal ridges $A^2$ for the webbing B' to move against in drawing down the same or rewinding it on the roller $B^2$ of the shade.

On the ends of the casing A are held the heads C C', fitted to slide longitudinally on the casing to lengthen or shorten the device, according to the length of the shade, the head C being provided at its ends with a centrally-arranged rectangular opening $C^2$ for the passage of the correspondingly-shaped fixed trunnion $B^3$ of the shade-roller $B^2$. The other head C' is formed in its end with a central aperture $C^3$ for the passage of the revolving trunnion $B^4$ of the shade-roller $B^2$, the trunnions $B^3$ and $B^4$ engaging the usual bearings D D', secured to the window-casing F, the trunnion $B^3$ being held stationary in its bearing D and the trunnion $B^4$ being mounted to turn in its bearing D'.

The heads C and C' are so adjusted lengthwise on the casing F that the ends of the trunnions project the desired distance from the heads to properly engage the bearings D D' in the usual manner.

Into the slot A' project longitudinally-extending strips E, of felt or like material, secured to the sides of the casing and arranged to engage with their free ends the sides of the webbing B' and wipe the same when the webbing is drawn down or rewound upon the roller $B^2$, so that the said webbing is kept clean at all times. At the same time the said strips E prevent any dust from passing through the slot A' into the inside of the casing A. Now it will be seen that by the arrangement described the shade-roller and a part of the webbing wound thereon is completely inclosed within the casing A, so as to protect the shade from dust and the like, and at the same time permits of unwinding and winding up the webbing B' in the usual manner.

It is understood that the roller $B^2$ referred to is of the ordinary spring-roller type now generally employed.

It will further be seen that the heads C and C' have their cylindrical flanges $C^4$ slotted to abut against the turned-up sides of the casing A, as is plainly indicated in Fig. 5, to prevent the ends of the flanges from projecting into the slot A' and to securely engage the casing A without turning thereon.

In order to place the casing in position, an ordinary shade, when detached from the bearings D D', is passed into the casing, and then the heads C C' are slipped over the ends of the casing to engage with their central apertures $C^2$ $C^3$ the corresponding trunnions $B^3$ $B^4$. The casing is now properly supported on the said trunnions, and the entire device can be connected with the bearings D D' in the usual manner.

It is evident that the casing A is wholly supported by and carried on the shade itself and is not attached to the window-casing, as is so frequently the case with shade-protectors heretofore employed, and it is evident that by this construction the shade with the casing can be readily removed from the bearings and replaced thereon whenever desired.

The longitudinal ridges $A^2$ form a stop for the lower usually-thickened end of the shade-webbing and prevent the same from passing around the roller in case the upward or return movement of the webbing is not checked in time by the operator.

For very long shade-rollers the casing A may be made in telescoping sections, if desired.

Having thus fully described my invention, I claim as new and desire to secure by Letters Patent—

1. A shade-protecting casing, comprising a casing having a longitudinal slot for the passage of the shade-webbing, and heads engaging the said casing and the stationary and revolving trunnions of the shade-roller, to support the entire casing from the trunnions, substantially as shown and described.

2. A shade-protecting casing, comprising a casing having a longitudinal slot for the passage of the shade-webbing, and heads held on the ends of the said casing, one of the heads being formed with an oblong aperture for the passage of the fixed trunnion of the shade-roller, and the other head being formed with an aperture for the revolving trunnion of the shade-roller, substantially as shown and described.

3. A shade-protecting casing, comprising a casing having a longitudinal slot for the passage of the shade-webbing, heads engaging the said casing and the stationary and revolving trunnions of the shade-roller, to support the entire casing from the trunnions, and wipers held in the said casing and extending into the said slot, to engage the webbing of the shade, substantially as shown and described.

CHARLES F. KRAEMER.

Witnesses:
CHARLES W. SCHLESINGER,
JOHN P. KRAEMER.